(12) United States Patent
Servant et al.

(10) Patent No.: US 7,938,230 B2
(45) Date of Patent: *May 10, 2011

(54) DEVICE FOR LUBRICATING A COMPONENT IN AN ASSEMBLY OF PARTS

(75) Inventors: Régis Servant, Vigneux-sur Seine (FR); Gaël Bouchy, La Chapelle Iger (FR); Guy Lapergue, Rubelles (FR)

(73) Assignee: SNECMA, Paris (FR)

( * ) Notice: Subject to any disclaimer, the term of this patent is extended or adjusted under 35 U.S.C. 154(b) by 1226 days.

This patent is subject to a terminal disclaimer.

(21) Appl. No.: 11/113,049

(22) Filed: Apr. 25, 2005

(65) Prior Publication Data

US 2005/0247526 A1  Nov. 10, 2005

(30) Foreign Application Priority Data

Apr. 29, 2004  (FR) .................................... 04 04545

(51) Int. Cl.
*F01M 9/00*  (2006.01)
(52) U.S. Cl. ........................... 184/6.1; 184/6.11
(58) Field of Classification Search ............. 184/6.11; 277/345
See application file for complete search history.

(56) References Cited

U.S. PATENT DOCUMENTS

| | | |
|---|---|---|
| 1,384,470 A | 7/1921 | Kempton |
| 1,420,585 A | 6/1922 | Sparks |
| 1,616,002 A | 2/1927 | Rogers |
| 2,866,522 A * | 12/1958 | Walton et al. ............... 184/6.11 |
| 3,266,596 A * | 8/1966 | Blackhurst et al. .............. 184/6 |
| 3,621,937 A * | 11/1971 | Edge et al. ...................... 464/16 |
| 5,119,905 A * | 6/1992 | Murray ......................... 184/6.11 |
| 5,647,597 A * | 7/1997 | Grochowski ................... 277/551 |
| 5,791,193 A * | 8/1998 | Uematsu et al. ................ 74/467 |
| 6,431,551 B1 * | 8/2002 | Fuse et al. ...................... 277/390 |
| 6,579,202 B2 * | 6/2003 | El-Antably et al. .......... 475/159 |
| 7,009,317 B2 * | 3/2006 | Cronin et al. ................... 310/54 |
| 7,431,006 B2 * | 10/2008 | Jankuski .................... 123/196 R |
| 7,537,537 B2 * | 5/2009 | Smet et al. .................... 475/159 |
| 2001/0021349 A1 * | 9/2001 | Nishimura ..................... 417/297 |
| 2001/0023796 A1 * | 9/2001 | Taki et al. ..................... 184/6.14 |
| 2001/0027900 A1 * | 10/2001 | Wilcox ........................ 184/105.3 |
| 2004/0188181 A1 * | 9/2004 | Hori et al. .................... 184/6.12 |

FOREIGN PATENT DOCUMENTS

GB  19555  7/1914

* cited by examiner

*Primary Examiner* — Bradley T King
*Assistant Examiner* — James K Hsiao
(74) *Attorney, Agent, or Firm* — Oblon, Spivak, McClelland, Maier & Neustadt, L.L.P.

(57) ABSTRACT

A device for lubricating a component in an assembly of parts comprises a lubricant distribution chamber arranged in the vicinity of the component and formed by an annular setback in a ring mounted on a part of the assembly, said setback being closed automatically when the ring is mounted by means of a corresponding surface of the part into which there open out channels or ducts formed in the part and feeding the setback with lubricant and/or connecting the setback to means for taking lubricant to the component.

10 Claims, 4 Drawing Sheets

DEVICE FOR LUBRICATING A COMPONENT IN AN ASSEMBLY OF PARTS

The present invention relates to a device for lubricating a component in an assembly of parts.

BACKGROUND OF THE INVENTION

In some circumstances, the component to be lubricated is difficult to access and the lubricant feed ducts cannot reach the component directly or they occupy too much space around the component and the parts associated with the component.

This problem can sometimes be solved by making the lubricant feed ducts pass through parts situated in the vicinity of the component, but that solution is not always practical, in particular when the lubricant ducts need to pass through moving parts.

Another known solution consists in forming a lubricant distribution chamber in a part situated close to the component and to connect said chamber via one or more points to a lubricant feed and via one or more other points to means for taking lubricant to the component.

For reasons of expense, the chamber may be constituted by an annular groove or setback machined in a surface of the part and closed in leaktight manner by means of a metal sheet covering the groove or setback and welded to the surface of the part.

That solution has been applied in particular to lubricating a bearing for guiding a hub secured to a rotary shaft of a low pressure turbine in a turbojet, the lubricant distribution chamber being constituted by an annular groove formed in a cylindrical surface of a part for supporting the outer ball-race of the bearing.

That known solution solves the problem of finding space, but it still suffers from certain drawbacks:
- the annular groove forming the distribution chamber is machined in the support part by milling, which can be quite difficult and awkward to do;
- the groove is closed by a metal sheet welded continuously along its edges on either side of the annular groove, which is an operation that is quite lengthy and difficult to perform;
- the closed groove cannot be reopened; and
- that solution cannot be implemented with materials that are difficult to weld or braze.

OBJECTS AND SUMMARY OF THE INVENTION

A particular object of the invention is to provide a solution to those problems that is simple, effective, and inexpensive.

The invention provides a device for lubricating a component that does not present the above-mentioned drawbacks of known devices.

To this end, the invention provides a device for lubricating a component in an assembly of parts, the device comprising a lubricant distribution chamber arranged in the vicinity of the component, feed means for feeding said chamber with lubricant, and means connecting the chamber to means for taking the lubricant to the component, wherein said chamber is formed by an annular setback in a ring mounted on one of the parts of said assembly, said setback being closed automatically by a corresponding surface of said part when the ring is mounted thereon, channels or ducts formed in said part opening out into said surface and constituting means for feeding the setback with lubricant and/or means connecting the setback to the above-mentioned means for taking lubricant to the component.

The invention presents the advantage that the lubricant distribution chamber is formed not in a solid part that needs subsequently to be closed by fitting a piece of sheet metal, but in a ring that is itself mounted to press against or as an interference fit on said part. This avoids a complex and expensive of machining a solid part. In addition, the chamber is closed automatically by the ring being assembled on the part by the ring that includes the setback having a portion that presses against the corresponding surface of the part, without it being necessary to weld or fasten in some other manner a closing piece of sheet metal on the ring.

The ring is held in place on the part in simple manner between an abutment formed on the part and a fitting which is secured to the part in removable or detachable manner, e.g. by screw-fastening.

The ring of the device of the invention can thus be mounted on the part in a manner that is simple, and it is held in place by a fitting that is removable or detachable.

In the above-mentioned circumstance of a bearing for guiding a hub secured to a shaft of a low pressure turbine in a turbojet, the fitting may be a rim of a ball-race, as described in detail below.

In a preferred embodiment, the device has at least two gaskets that are arranged on either side of the annular setback and that are clamped between the ring and the part, each gasket advantageously being received in an annular groove in said ring.

This provides good sealing to the distribution chamber formed by the setback in the ring, such sealing being obtained in a manner that is simple and inexpensive without interfering with ease of assembling the ring on the part.

In a preferred embodiment of the invention, the ring is mounted by being moved in axial translation over at least one cylindrical bearing surface of the part.

Advantageously, the ring includes an annular rim at one of its axial ends, the rim forming catch means for being engaged by a traction tool in order to detach the ring.

This enables the ring to be detached simply and quickly by applying axial traction thereto, pulling it away from the part.

The invention is particularly, but not exclusively, applicable to a bearing for guiding a hub secured to a rotary shaft relative to a part for supporting a ring of the bearing, the rotary shaft being constituted, for example, by a shaft of a low pressure turbine in a turbojet.

BRIEF DESCRIPTION OF THE DRAWINGS

Other advantages and characteristics of the invention appear on reading the following description made by way of non-limiting example and with reference to the accompanying drawings, in which.

MORE DETAILED DESCRIPTION

Figure 1:
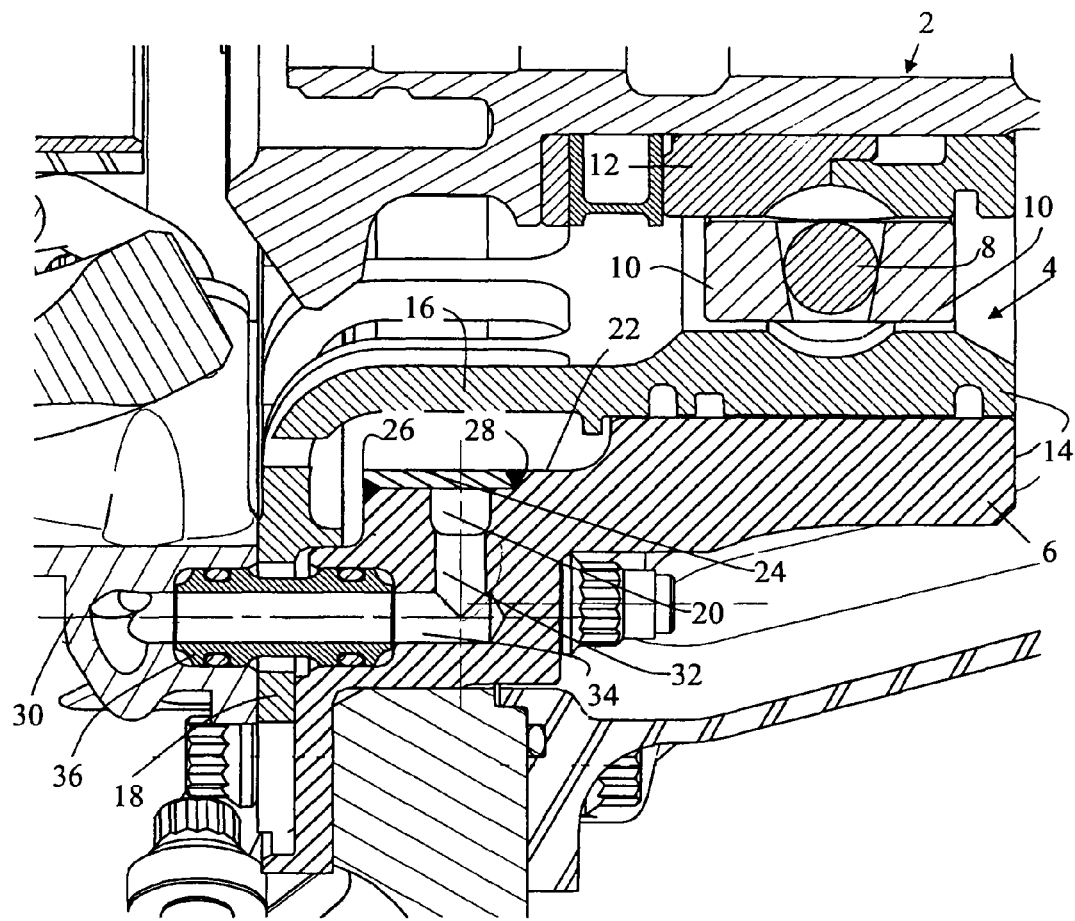
FIG. 1 is a diagrammatic fragmentary axial section view of a known device for lubricating a bearing for guiding a hub secured to a low pressure turbine shaft of a turbojet.

Reference is made initially to FIG. 1 which shows a portion of a prior art device for lubricating a bearing for guiding a hub secured to the shaft of a low pressure turbine in a turbojet.

The hub 2 is centered and guided in rotation by a bearing 4 mounted in a bore of a cylindrical support part 6, itself mounted and secured to a stationary part, e.g. a part of the stator of a high pressure compressor in a turbojet.

The bearing 4 has a plurality of rolling members such as, for example, balls 8, which are held axially between two annular elements 10 and which travel along a raceway defined by ball-races 12 and 14 of the bearing, respectively an inner ball-race and an outer ball-race.

The radially-inner ball-race 12 of the bearing is secured to the hub 2, and the radially-outer ball-race 14 of the bearing is mounted in the bore of the support part 6.

The radially-outer ball-race 14 of the bearing has an axial extension 16 extending upstream and terminated by an annular rim 18 extending radially outwards and coming to press against a radial end face of the support part 6 in order to be secured thereto by suitable means such as screws.

The prior art device for lubricating the bearing 4 has an annular lubricant distribution chamber formed by an annular groove 20 in a cylindrical inside surface 22 of the upstream portion of the part 6, this groove 20 being milled in the cylindrical surface 22 and being closed by fitting a piece of sheet metal 24 that is welded at 26 and 28 to the part 6, continuously along its edges.

The annular groove 20 is connected to lubricant feed means 30 via a radial duct 32 opening out into the distribution chamber and via an axial duct 34 formed through the part 6 and connected to the feed means 30 via a cylindrical bushing 36 having a downstream end mounted in leaktight manner in a cylindrical orifice of the radial end face of the part 6, and having an upstream end mounted in leaktight manner in a cylindrical orifice of the feed means 30. The middle portion of the bushing 36 extends through an orifice in the annular rim 18 of the ball-race 14.

The annular groove 20 of the part 6 is connected to means for delivering lubricant into the bearing 4 by means that are described in detail below with reference to FIG. 4.

In the lubrication device of the invention, the groove 20 machined in the part 6 to form the distribution chamber is replaced by an annular setback in a feed ring fitted on the part 6.

Figure 2:
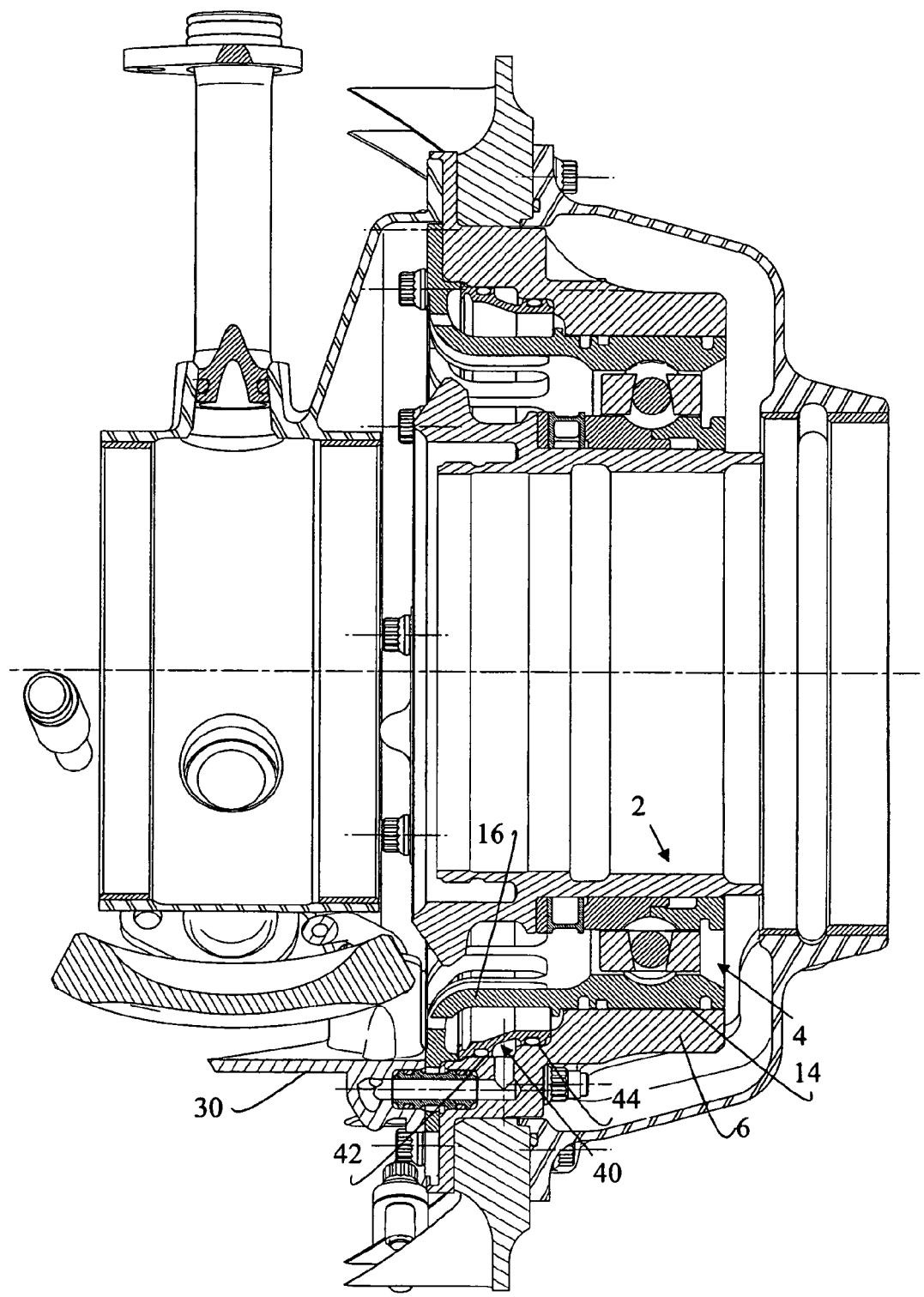
FIG. 2 is a diagrammatic axial section view of a lubrication device of the invention.
Figure 3:
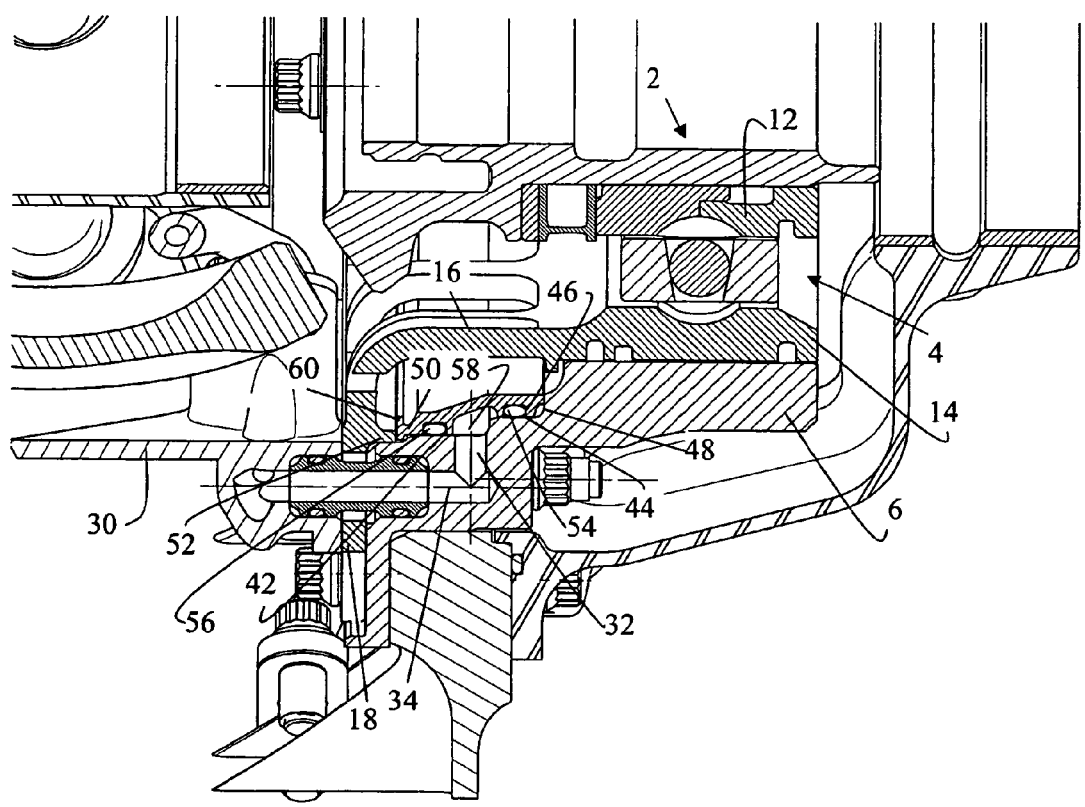
FIG. 3 is a fragmentary view of FIG. 2 on a larger scale.
Figure 4:
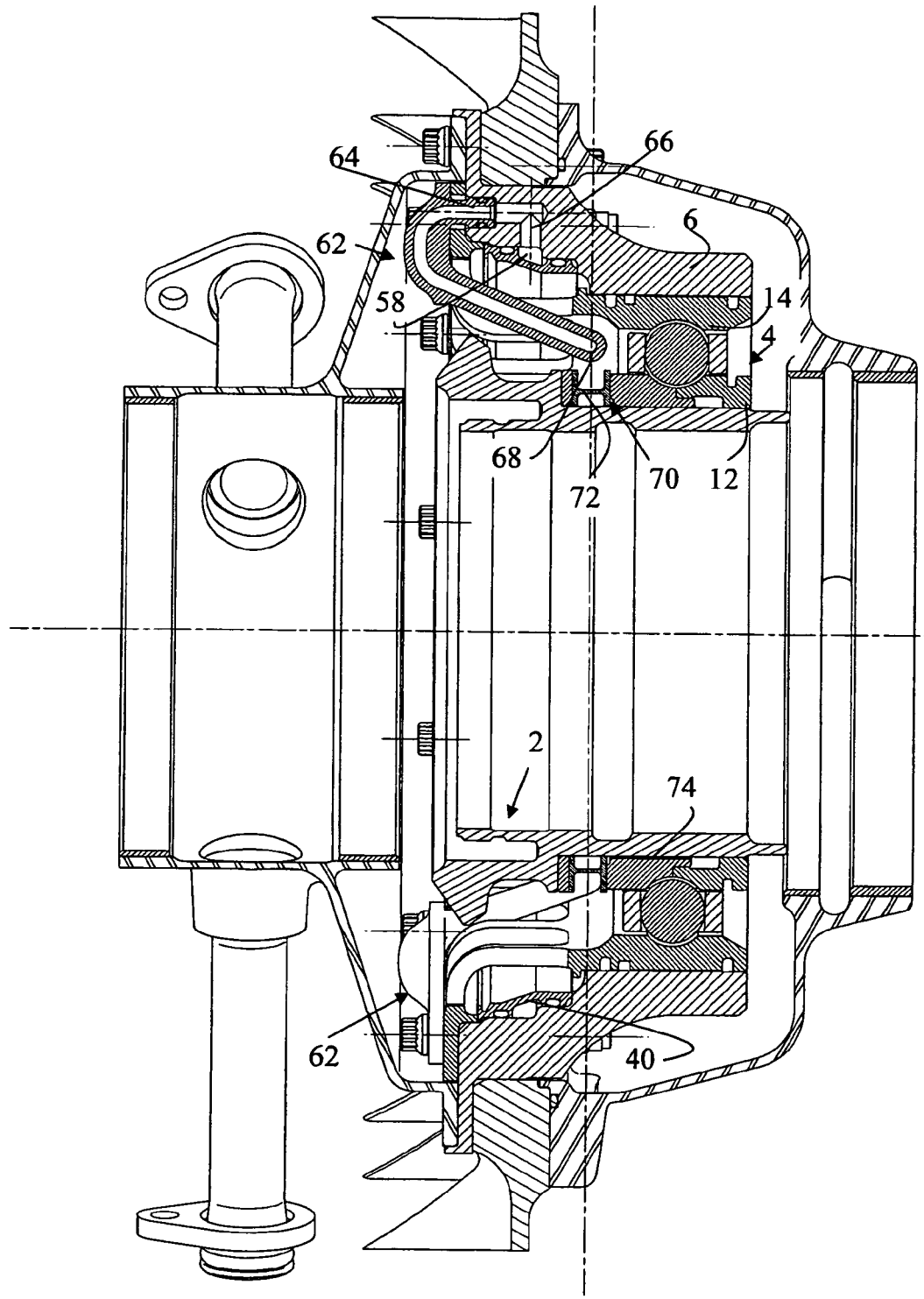
FIG. 4 is another diagrammatic axial section view of the FIG. 2 device, the section being on a plane other than the section plane of FIG. 2.

In the embodiment shown in FIGS. 2 to 4, this ring 40 is engaged in axial translation from the upstream end into the bore of the part 6 and presses against two cylindrical bearing surface 42 and 44 of different diameters that are connected to each other, these bearing surfaces 42 and 44 being formed in the upstream portion of the part 6 around the axial extension 16 of the outer ball-race 14.

The feed ring 40 has a downstream end 46 for pressing against the shoulder 48 of the inside surface of the part 6, and an upstream end 50 which forms a surface against which there bears a cylindrical rib 52 of the rim 18 of the outer ball-race 14.

The shoulder 48 and the rib 52 constitute means for preventing the feed ring 40 from moving axially in the bore of the part 6, these means generally being constituted by means having co-operating shapes.

The downstream portion of the ring 40 pressed against the cylindrical bearing surface 44 of the part 6 has an outer annular groove for housing a gasket 54 that co-operates with the cylindrical bearing surface 44. The upstream portion of the ring 40 also presents an outer annular groove for housing a gasket 56 pressed against the cylindrical bearing surface 42 of the part 6.

An annular setback 58 is formed in the feed ring 40 between the housings for the above-mentioned gaskets 54 and 56 and opening out to the radially-outer surface of the ring 40.

This setback 58 is externally covered and closed by the cylindrical bearing surface 42 of the part 6. A radial channel 32 identical to that described with reference to FIG. 1 is formed in the part 6 and opens out in the cylindrical bearing structure 42 in the setback 58 so as to connect it to the lubricant feed means 30.

At its upstream end 50, the ring 40 advantageously presents an annular rim 60 extending towards the inside and forming catch means for being engaged by a suitable tool for detaching the ring 40 by applying traction axially in the upstream direction.

FIG. 4 is another section view of the assembly shown in FIG. 2 and shows the means for taking lubricant into the bearing 4.

These means comprise a duct or tube 62 bent into a substantially J-shape with one end 64 facing downstream passing through an orifice in the annular rim 18 of the ball-race 14 and mounted in leaktight manner in an upstream end bore of the part 6 that is connected to the setback 58 of the feed ring 40 via a radial channel 66 in the part 6.

The other end of the duct 62 slopes downstream and towards the axis of the hub 2 and includes at least one lubricant outlet hole 68 opening out radially towards an annular element 70 that forms a centripetal scoop 72 that is securely mounted on the hub 2 between the inner ball-race 12 of the bearing 4 and an annular shoulder of the hub 2.

The centripetal scoop 72 receives lubricant leaving via the hole 68 in the duct 62 and takes it to the inside of the element 70 to the upstream end of an axial groove 74 formed in the inner ball-race 12 and which is connected at its downstream end to ducts or channels leading to the rolling members of the bearing 4.

While the turbojet is in operation, lubricant can be fed continuously to the setback 58 in the ring 40 via the means 30. The lubricant flows via the feed means 30, the bushing 36, the ducts 34 and 32, and the annular setback 58 of the ring 40. From there, the lubricant passes via the channel 66, the bore of the part 6, and then the duct 62, so as to leave via the hole 68 and be picked up by the centripetal scoop 72 which takes it to the axial groove 74 of the inner ball-race 12 of the bearing 4.

A plurality of ducts or tubes 62 may be connected to the annular setback 58 of the ring 40, in which case they should be regularly distributed around the circumference of the support part 6.

The feed ring 40 is preferably of light metal such as titanium of aluminum. The annular setback 58 is formed in said ring 40 by any suitable technique, e.g. by turning.

What is claimed is:

1. A device for lubricating a component in an assembly of parts, the device comprising a lubricant distribution chamber arranged in the vicinity of the component, wherein said chamber is formed by an annular groove in an outer surface of a ring mounted on two inner cylindrical bearing surfaces of one of the parts of said assembly, said inner cylindrical bearing surfaces having different diameters and being interconnected by a radial surface, wherein the ring comprises two annular grooves, located respectively upstream and downstream from the annular groove forming the chamber, said upstream and downstream annular grooves housing gaskets cooperating respectively with said two cylindrical bearing surfaces of the part, wherein said annular groove forming the chamber is closed by the inner cylindrical bearing surface of greater diameter and by said radial surface interconnecting said two inner cylindrical bearing surfaces, and wherein a first duct is formed in said part and opens out into the inner cylindrical bearing surface of greater diameter for feeding the groove with lubricant and a second duct being formed in said part and opening out into said inner cylindrical bearing surface with said greater diameter for taking lubricant from the groove to the component.

2. A device according to claim 1, wherein said ring is prevented from moving on the part between an abutment formed on said part and a fitting which is secured to said part in removable or detachable manner.

3. A device according to claim 1, wherein said ring is mounted by axial translation on at least one cylindrical bearing surface of said part.

4. A device according to claim 1, wherein said part has two cylindrical bearing surfaces of different diameters that are interconnected and on which said ring is engaged.

5. A device according to claim 1, wherein said ring is made of light metal.

6. A device according to claim 1, wherein the groove forming the chamber is formed in the ring by turning.

7. A device according to claim 1, wherein said ring includes an annular rim at one of its axial ends, the rim being configured for being engaged by a traction tool for detaching said ring.

8. A device according to claim 1, wherein the component is a bearing for guiding a hub secured to a rotary shaft, and said part is a support part for supporting a ball-race of the bearing.

9. A device according to claim 8, wherein the rotary shaft is a low pressure turbine shaft.

10. A device according to claim 1, wherein said ring is not welded to said inner cylindrical surface of said part.

* * * * *